US012384375B2

(12) United States Patent
Kato

(10) Patent No.: US 12,384,375 B2
(45) Date of Patent: Aug. 12, 2025

(54) VEHICLE SYSTEM, CONTROL METHOD, AND STORAGE MEDIUM

(71) Applicant: HONDA MOTOR CO., LTD., Tokyo (JP)

(72) Inventor: Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 18/119,852

(22) Filed: Mar. 10, 2023

(65) Prior Publication Data
US 2023/0311887 A1 Oct. 5, 2023

(30) Foreign Application Priority Data
Mar. 31, 2022 (JP) .................. 2022-060890

(51) Int. Cl.
B60W 30/18 (2012.01)
B60W 40/02 (2006.01)
B60W 50/10 (2012.01)
B60W 50/14 (2020.01)
B60W 60/00 (2020.01)

(52) U.S. Cl.
CPC ...... B60W 30/18163 (2013.01); B60W 40/02 (2013.01); B60W 50/10 (2013.01); B60W 50/14 (2013.01); B60W 60/001 (2020.02)

(58) Field of Classification Search
CPC .......... B60W 30/18163; B60W 50/14; B60W 60/001; B60W 30/12; B60K 2360/175
See application file for complete search history.

(56) References Cited

U.S. PATENT DOCUMENTS
2020/0180639 A1* 6/2020 Mizoguchi .......... B60W 60/001
2021/0139044 A1 5/2021 Ishioka
2022/0203992 A1 6/2022 Taniguchi FOREIGN PATENT DOCUMENTS
JP 2020-138578 9/2020
WO 2018/131290 7/2018
WO 2020/230303 11/2020

OTHER PUBLICATIONS

JP 2016071513 (Maruyama, filed Sep. 24, 2014) (Year: 2016).*
CN 117396384 (Taniguchi, filed May 28, 2021) (Year: 2024).*
Japanese Office Action for Japanese Patent Application No. 2022-060890 mailed Oct. 3, 2023.

* cited by examiner

Primary Examiner — Kito R Robinson
Assistant Examiner — Roy Rhee
(74) Attorney, Agent, or Firm — Amin, Turocy & Watson, LLP

(57) ABSTRACT

A vehicle system executes a first operation of presenting lane change to an adjacent lane adjacent to a lane in which a host vehicle travels to a driver without considering of guiding the host vehicle to a set destination, and causing the host vehicle to perform the lane change on the basis of an instruction of the driver, a second operation for proposing a lane change required for guidance of the host vehicle to the destination to the driver and causing the host vehicle to perform a lane change on the basis of approval of the proposal by the driver, and a third operation for stopping presenting and proposing the lane change in a set period between the first operation and the second operation when a plan is to execute the second operation after the first operation.

14 Claims, 6 Drawing Sheets

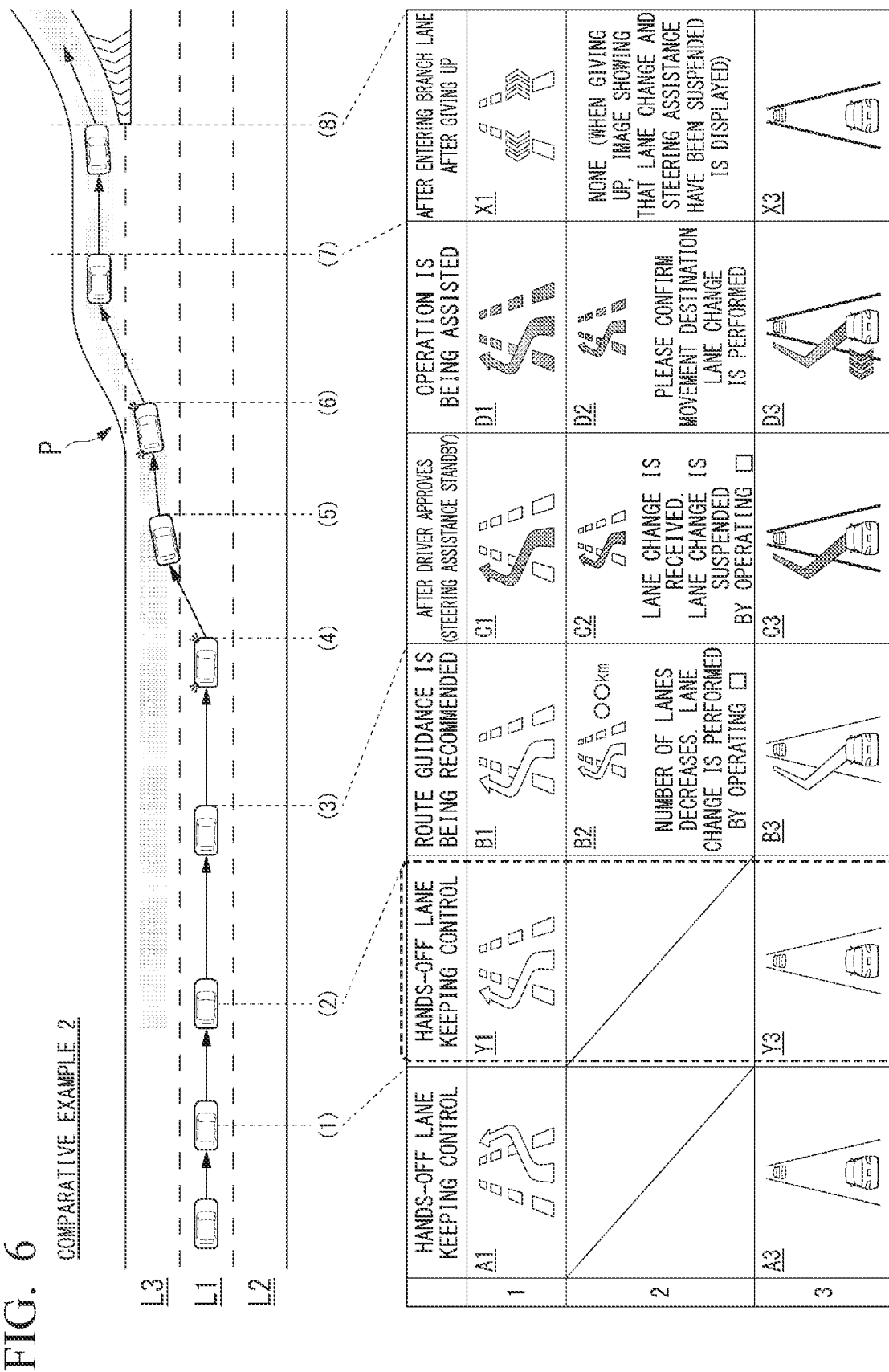

VEHICLE SYSTEM, CONTROL METHOD, AND STORAGE MEDIUM

CROSS-REFERENCE TO RELATED APPLICATION

Priority is claimed on Japanese Patent Application No. 2022-060890, filed Mar. 31, 2022, the content of which is incorporated herein by reference.

BACKGROUND

Field

The present invention relates to a vehicle system, a control method, and a storage medium.

Description of Related Art

In recent years, efforts to provide a sustainable transportation system that takes various situations into account have become active. In order to realize this, research and development are focused on further improving the safety or convenience of traffic through research and development regarding driving assistance technology. For example, a vehicle control device that executes automatic lane change control has been disclosed (Japanese Unexamined Patent Application, First Publication No. 2020-138578).

SUMMARY

In vehicle control systems of the related art, proposals to a driver regarding a lane change have not been considered in detail. Therefore, convenience for a user is not sufficiently high.

The present invention has been made in consideration of such circumstances, and one object thereof is to provide a vehicle system, a control method, and a storage medium capable of further improving convenience for a user. Further, the present invention contributes to the development of sustainable transportation systems.

A vehicle system, a control method, and a storage medium according to the present invention adopt the following configurations.

(1): A vehicle system according to an aspect of the present invention includes a storage medium configured to store computer-readable instructions; and one or more processors connected to the storage medium, wherein the one or more processors execute the computer-readable instructions to: recognize a situation of surroundings of a host vehicle, automatically control at least steering of the host vehicle to cause the host vehicle to perform a lane change on the basis of the recognized situation of the surroundings, a first operation of presenting, to a driver, a lane change to an adjacent lane adjacent to a lane in which the host vehicle travels without considering of guiding the host vehicle to a set destination, and causing the host vehicle to perform the lane change on the basis of an instruction of the driver, a second operation of proposing a lane change required for guidance of the host vehicle to the destination to the driver and causing the host vehicle to perform a lane change on the basis of approval of the proposal by the driver, and a third operation of stopping presenting and proposing the lane change in a set period between the first operation and the second operation when a plan is to execute the second operation after the first operation.

(2): In the aspect (1), the one or more processors execute the computer-readable instructions to cause the host vehicle to perform a lane change a plurality of times to guide the host vehicle to the destination according to one approval when the driver performs one approval of the proposal in a case in which a plurality of lane changes are required to guide the host vehicle to the destination in the second operation.

(3): In the aspect (1) or (2), the instruction or approval is one or both of the driver operating a predetermined button and the driver gripping a steering wheel.

(4): In any one of the aspect (1) to (3), the second operation is an operation of proposing a lane change to a branch lane to the driver when the host vehicle is traveling in a lane different from a branch lane in which the host vehicle is scheduled to travel toward the destination, and causing the host vehicle to perform the lane change to the branch lane without relying on driving of the driver on the basis of the approval of the proposal by the driver.

(5): In any one of the aspects (1) to (4), in the first operation, presenting the lane change from the lane in which the host vehicle travels to an adjacent lane in which lane change is possible is repeated, and the host vehicle is caused to perform the lane change to the adjacent lane on the basis of an instruction of the driver.

(6): In any one of the aspects (1) to (5), the one or more processors execute the computer-readable instructions to cause a first image recommending a lane change to be displayed on the display in the first operation, cause a second image recommending a lane change to be displayed on the display after third operation ends and the second operation is started, and cause a third image different from the first image and the second image to be displayed on the display in the third operation.

(7): In the aspect (6), the third image is not an image showing presenting or proposing the lane change, but is an image showing that causing the host vehicle to perform the lane change is possible without relying on driving of the driver on the basis of an operation according to an intention of the driver.

(8): In the aspect (7), the third image is an image showing that causing the host vehicle to perform the lane change by the driver operating an operator for operating the direction indicator is possible.

(9): In any one of the aspects (6) to (8), the second operation is an operation of proposing a lane change to a branch lane to the driver when the host vehicle is traveling in a lane different from a branch lane in which the host vehicle is scheduled to travel toward the destination, and causing the host vehicle to perform the lane change to the branch lane without relying on driving of the driver on the basis of the approval of the proposal by the driver, and the one or more processors execute the computer-readable instructions to cause an image, the image being not an image showing presenting or proposing the lane change but being an image showing that causing the host vehicle to automatically perform the lane change is possible without relying on driving of the driver on the basis of an operation according to an intention of the driver, to be displayed on a display, when the host vehicle has performed lane change to the branch lane.

(10): In any one of the aspects (1) to (9), the one or more processors execute the computer-readable instructions to cause the host vehicle to perform the lane change in response to a predetermined operation when the driver performs the predetermined operation with respect to an operator for operating a direction indicator in a case in which the third operation is being performed.

(11): In any one of the aspects (1) to (10), when the host vehicle is traveling in a first lane on a road having the first lane, a second lane serving as an overtaking lane adjacent to the first lane, and a third lane adjacent to the first lane connecting to a branch lane, the one or more processors execute the computer-readable instructions to perform presenting causing the host vehicle to perform a lane change to the second lane serving as an overtaking lane in the first operation, and make a proposal to cause the host vehicle to perform a lane change to the third lane in the second operation after the third operation.

(12): A control method according to another aspect of the present invention including: processing for recognizing, by a control device, a situation of surroundings of a host vehicle; processing for automatically controlling, by the control device, at least steering of the host vehicle to cause the host vehicle to perform the lane change on the basis of the recognized situation of the surroundings; first processing for presenting, by the control device, a lane change to an adjacent lane adjacent to a lane in which the host vehicle travels to a driver without considering of guiding the host vehicle to a set destination, and causing the host vehicle to perform the lane change on the basis of an instruction of the driver; second processing for proposing, by the control device, lane change required for guidance of the host vehicle to the destination to the driver and causing the host vehicle to perform a lane change on the basis of approval of the proposal by the driver; and third processing for stopping, by the control device, presenting and proposing the lane change in a set period between the first processing and the second processing when a plan is to execute the second processing after the first processing.

(13): A non-transitory computer storage medium having a program stored therein, the program causing a control device to execute: processing for recognizing a situation of surroundings of a host vehicle; processing for automatically controlling at least steering of the host vehicle to cause the host vehicle to perform the lane change on the basis of the recognized situation of the surroundings; first processing for presenting lane change to an adjacent lane adjacent to a lane in which the host vehicle travels to a driver without considering of guiding the host vehicle to a set destination, and causing the host vehicle to perform the lane change on the basis of an instruction of the driver; second processing for proposing a lane change required for guidance of the host vehicle to the destination to the driver and causing the host vehicle to perform a lane change on the basis of approval of the proposal by the driver; and third processing for stopping presenting and proposing the lane change in a set period between the first processing and the second processing when a plan is to execute the second processing after the first processing.

According to aspects (1) to (13), the vehicle system stops presenting and proposing a lane change during the set period between the first operation and the second operation, thereby improving convenience for a user.

According to the aspect (2), since the vehicle system causes the host vehicle to perform the lane change a plurality of times with one approval, the user can direct the host vehicle to the destination without performing a plurality of approvals.

According to the aspect (6), the vehicle system causes a third image different from the first image and the second image to be displayed on the display in the third operation, making it possible for the user to easily recognize that the third operation is performed and lane change is not recommended.

According to the aspect (7) or (8), since the vehicle system causes an image showing that the driver causing the host vehicle to perform a lane change by performing a predetermined operation is not restricted to be displayed on a display, convenience for the driver is improved.

According to the aspect (9), since the vehicle system causes an image showing that the lane change is not recommended but is possible according to an operation of the driver when the host vehicle has performed the lane change to the branch lane to be displayed on a display, convenience for the driver is improved.

BRIEF DESCRIPTION OF THE DRAWINGS

FIG. 6 is a diagram for describing comparative example 2.

DETAILED DESCRIPTION

[Overall Configuration]

Figure 1:
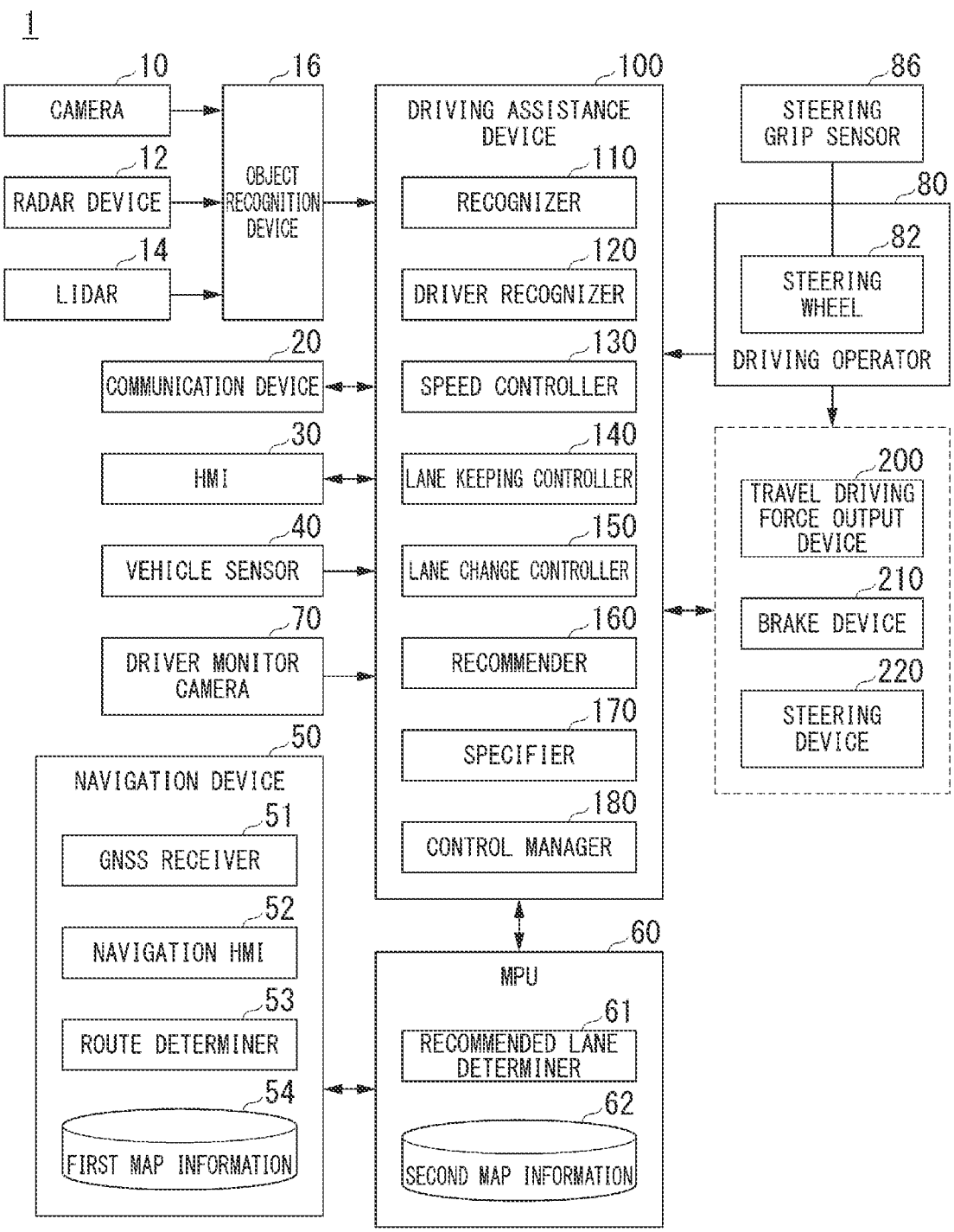
FIG. 1 is a configuration diagram of a vehicle system using a vehicle control system according to an embodiment.

FIG. 1 is a configuration diagram of a vehicle system 1 using a vehicle control system according to an embodiment. The vehicle system 1 is mounted on a vehicle such as a two-wheeled vehicle, a three-wheeled vehicle, or a four-wheeled vehicle, and a driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, an MPU 60, a driver monitor camera 70, a driving operator 80, a driving assistance device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and part of the configuration may be omitted or other configurations may be added thereto. The driving assistance device 100 is an example of a "control device".

The camera 10 is, for example, a digital camera using a solid-state imaging device such as a charge coupled device (CCD) or a complementary metal oxide semiconductor (CMOS). The camera 10 is attached to any location on a vehicle on which the vehicle system 1 is mounted (hereinafter referred to as a host vehicle M). When a forward side is imaged, the camera 10 is attached to, for example, an upper portion of a front windshield, a rear surface of a rearview mirror, or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and orientation) thereof. The radar device 12 is attached to any location on the host vehicle M. The radar device 12 may detect a position and a speed of the object using a frequency modulated continuous wave (FM-CW) scheme.

The LIDAR 14 irradiates the surroundings of the host vehicle M with light (or an electromagnetic wave having a wavelength close to that of light) and measures scattered light. The LIDAR 14 detects the distance to a target on the basis of the amount of time from light emission to light reception. The light to be radiated is, for example, pulsed laser light. The LIDAR 14 is attached to any location on the host vehicle M.

The object recognition device 16 performs sensor fusion processing on detection results of some or all of the camera 10, the radar device 12, and the LIDAR 14 to recognize a position, type, speed, and the like of the object. The object recognition device 16 outputs recognition results to the driving assistance device 100. The object recognition device 16 may output detection results of the camera 10, the radar device 12, and the LIDAR 14 as they are to the driving assistance device 100. The object recognition device 16 may be omitted from the vehicle system 1.

The communication device 20, for example, communicates with another vehicle present around the host vehicle M using a cellular network, a Wi-Fi network, Bluetooth (registered trademark), dedicated short range communication (DSRC), or the like or communicates with various server devices via a wireless base station.

The HMI 30 presents various types of information to an occupant of the host vehicle M and receives an input operation from the occupant. The HMI 30 includes various display devices, speakers, buzzers, touch panels, switches, keys, and the like. The HMI 30 has a display device. The display device is a so-called multi-information display, which is a display device that is provided, for example, in a central part of an instrument panel of the host vehicle M and displays various types of information in the host vehicle M, of a speedometer that indicates a traveling speed of the host vehicle M or a tachometer that indicates the number of rotations (a rotational speed) of an internal combustion engine included in the host vehicle M.

The vehicle sensor 40 includes, for example, a vehicle speed sensor that detects a speed of the host vehicle M, an acceleration sensor that detects an acceleration, a yaw rate sensor that detects an angular speed around a vertical axis, and an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies the position of the host vehicle M on the basis of a signal received from a GNSS satellite. The position of the host vehicle M may be specified or complemented by an inertial navigation system (INS) using an output of the vehicle sensor 40. The navigation HMI 52 includes a display device, a speaker, a touch panel, keys, and the like. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guidance using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route to a branch destination when there is a branch location in the on-map route.

The second map information 62 is map information with higher accuracy than the first map information 54. The second map information 62 includes, for example, information on the center of the lane or information on a boundary of the lane. The second map information 62 may include road information, traffic regulation information, address information (an address and postal code), facility information, telephone number information, information on a prohibited section in which a mode A or mode B is prohibited, which will be described later, and the like. The second map information 62 may be updated at any time by the communication device 20 communicating with another device.

The driver monitor camera 70 is, for example, a digital camera using a solid-state imaging device such as a CCD or CMOS. The driver monitor camera 70 is attached to any location on the host vehicle M at a position and orientation at which a head of an occupant (hereinafter referred to as a driver) seated in a seat of the driver of the host vehicle M can be imaged from the front (in an orientation in which a face is imaged). For example, the driver monitor camera 70 is attached to an upper part of the display device provided in the central part of the instrument panel of the host vehicle M. The driver monitor camera 70 outputs to the driving assistance device 100 an image obtained by imaging the vehicle cabin including the driver of the host vehicle M from a position at which the driver monitor camera 70 is disposed.

The driving operator 80 includes, for example, an operation switch of a direction indicator, an accelerator pedal, a brake pedal, a shift lever, and other operators, in addition a steering wheel 82. A sensor that detects an amount of operation or the presence or absence of an operation is attached to the driving operator 80, and a detection result thereof is output to the driving assistance device 100, or some or all of the travel driving force output device 200, the brake device 210, and the steering device 220. The steering wheel 82 does not necessarily have to be annular but may be in the form of a modified steering wheel, joystick, buttons, or the like. A steering grip sensor 86 is attached to the steering wheel 82.

The steering grip sensor 86 is realized by, for example, a capacitance sensor or a piezoelectric element. The steering grip sensor 86 detects whether or not the driver is gripping the steering wheel 82. The gripping is a state in which the driver grips the steering wheel, a state in which a hand comes into contact with the steering wheel and a predetermined degree or more of force is applied to the steering wheel, or the like.

The steering grip sensor 86 may detect grip based on an image captured by a camera or detect the grip using an optical scheme such as a radar device (a scheme that does not require contact with a sensor).

The driving assistance device 100 includes, for example, a recognizer 110, a driver recognizer 120, a speed controller 130, a lane keeping controller 140, a lane change controller 150, a recommender 160, a specifier 170, a control manager 180. Some or all of these functional units are realized, for example, by a hardware processor such as a central processing unit (CPU) executing a program (software). Some or all of these components may be realized by hardware (circuit; including circuitry) such as a large-scale integration (LSI), an application specific integrated circuit (ASIC), a field-programmable gate array (FPGA), or a graphics processing unit (GPU), or may be realized by software and hardware in cooperation. The program may be stored in a storage device (a storage device including a non-transitory storage medium) such as an HDD or a flash memory of the driving assistance device 100 in advance or may be stored in a detachable storage medium such as a DVD or a CD-ROM and installed in the HDD or flash memory of the driving assistance device 100 by the storage medium (a non-transitory storage medium) being mounted in a drive device. A functional configuration including the lane change controller 150, the recommender 160, and the control manager 180 is an example of a "controller".

The recognizer 110 recognizes a status such as a position, speed, and acceleration of an object present around the host vehicle M on the basis of information input from the camera 10, the radar device 12, and the LIDAR 14 via the object recognition device 16. The position of the object, for example, is recognized as a position at absolute coordinates with a representative point (a centroid, a drive shaft center, or the like) of the host vehicle M as an origin and is used for control. The position of the object may be represented by a representative point such as a centroid or a corner of the object or may be represented by an area. The "status" of the object may include an acceleration or jerk of the object, or an "action status" (for example, whether or not the object is changing lanes or is about to perform a lane change).

The recognizer 110, for example, recognizes a lane (a traveling lane) in which the host vehicle M is traveling. For example, the recognizer 110 compares a pattern of road demarcation lines (for example, an arrangement of solid lines and broken lines) obtained from the second map information 62 with a pattern of road demarcation lines around the host vehicle M recognized from an image captured by the camera 10 to recognize the traveling lane. The recognizer 110 may recognize not only the road demarcation lines but also a traveling road boundary (a road boundary) including road demarcation lines, a road shoulder, a curb, a median strip, a guard rail, or the like to recognize the traveling lane. In this recognition, the position of the host vehicle M acquired from the navigation device 50 or a processing result of the INS may be additionally considered. The recognizer 110 recognizes a temporary stop line, an obstacle, a red signal, a toll gate, and other road events.

The recognizer 110 recognizes the position or orientation of the host vehicle M with respect to the traveling lane when recognizing the traveling lane. The recognizer 110 may recognize, for example, a deviation of a reference point of the host vehicle M from a center of the lane and an angle formed between a traveling direction of the host vehicle M and a line connecting the center of the lane as a relative position and orientation of the host vehicle M with respect to the traveling lane. Instead, the recognizer 110 may recognize, for example, a position of the reference point of the host vehicle M with respect to any one of side edge portions (the road demarcation line or the road boundary) of the traveling lane as the relative position of the host vehicle M with respect to the traveling lane.

The driver recognizer 120 detects whether the driver is in a predetermined state on the basis of the image captured by the driver monitor camera 70. The predetermined state is a state in which hands-off lane keeping control, which will be described later, is executable. Hands-off is a state in which the driver does not grip the steering wheel, and hands-on is a state in which the driver grips the steering wheel. The state in which the hands-off lane keeping control is executable is a state in which the driver monitors the forward side. Monitoring the forward side means, for example, that the driver monitors the forward side so that the driver can rapidly perform takeover from control of the vehicle by the system to an operation with respect to the vehicle by the driver. Monitoring the forward side means, for example, that a line of sight of the driver is directed to the forward side.

The speed controller 130 automatically controls the travel driving force output device 200 and the brake device 210 without relying on an operation of the driver to automatically control the speed of the host vehicle M. The speed controller 130 executes so-called adaptive cruise control (ACC).

For example, when another vehicle is not present in front of the host vehicle M and within a predetermined distance from the host vehicle M, the speed controller 130 automatically controls the travel driving force output device 200 and the brake device 210 without relying on an operation of the driver so that the host vehicle M moves at a speed set by the driver or a legal speed.

For example, when another vehicle is present in front of the host vehicle M and within the predetermined distance from the host vehicle M, the speed controller 130 automatically controls the travel driving force output device 200 and the brake device 210 without relying on an operation of the driver so that the host vehicle M follows the other vehicle. Following means that the host vehicle M travels while maintaining a position behind the other vehicle and at a predetermined distance from the other vehicle.

The lane keeping controller 140 controls the steering device 220 so that the host vehicle M does not deviate from the traveling lane. For example, the lane keeping controller 140 controls the steering device 220 so that the host vehicle M travels at a center or near the center of the traveling lane recognized by the recognizer 110. Hereinafter, this control may be referred to as "lane keeping control". The Lane keeping controller 140 performs hands-on lane keeping control and hands-off lane keeping control.

The hands-on lane keeping control is control that is executed in the state in which the driver is gripping the steering wheel (a state in which the steering grip sensor 86 is detecting gripping of the steering wheel). The conditions under which the hands-on lane keeping control is executable are looser than the conditions under which the hands-off lane keeping control is executable. For example, the hands-on lane keeping control is executed on the condition that the speed of the host vehicle M is equal to or higher than a predetermined speed and the driver is monitoring the forward side.

The hands-off lane keeping control is control that is executed in a state in which the driver does not grip the steering wheel (a state in which the steering grip sensor 86 does not detect gripping of the steering wheel). The hands-off lane keeping control is executable, for example, when the following conditions are satisfied. The conditions are that the speed of the host vehicle M is equal to or higher than the predetermined speed, that the host vehicle M travels on a predetermined road (for example, a road or a type of road set in advance as the hands-off lane keeping control being executable), and that the driver monitors the forward side. The hands-off lane keeping control is executed when the driver monitors the forward side, and the hands-off lane keeping control is not executed or stopped when the driver does not monitor the forward side.

The conditions under which the hands-on lane keeping control and the hands-off lane keeping control described above are executable are examples, and other conditions (for example, the host vehicle M follows a preceding vehicle) may be included, or some of the conditions may be omitted. The conditions under which the hands-on lane keeping control is executable may be looser than the conditions under which the hands-off lane keeping control is executable (the conditions under which the hands-off lane keeping control is executable may be stricter than the conditions under which the hands-on lane keeping control is executable).

The lane change controller 150 causes the host vehicle M to automatically change lanes. The lane change controller 150 causes the host vehicle M to automatically change lanes (ALC: auto lane change) when a lane change instruction is issued by the driver in a state in which the hands-off lane keeping control is being executed. The lane change instruction is, for example, an operation with respect to a lever of the operation switch of the direction indicator. For example, when the driver operates the lever in a direction in which the host vehicle M is desired to perform lane change, the host vehicle M performs a lane change in a direction corresponding to the operation. The lane change instruction may be an operation different from the operation with respect to the lever of the operation switch of the direction indicator. For example, the lane change may be performed when a set operation button is pressed. When the driver instructs or approves the recommendation (presentation or proposal) of the recommender 160, which will be described later, the lane change controller 150 causes the host vehicle M to perform a lane change on the basis of the instruction or approval.

The lane change controller 150, for example, may execute lane change on the condition that the driver is gripping the steering wheel (the steering grip sensor 86 detects gripping of the steering wheel). The lane change controller 150 executes the lane change when the driver grips the steering wheel and further when the following conditions are satisfied, for example.

The conditions are, for example, that there are no obstacles in a lane that is a lane change destination, that the host vehicle M does not interfere with other vehicles around the host vehicle M when the host vehicle M performs the lane change, that a section is not a section in which a lane change is prohibited (there are no road marking or sign indicating prohibition of a lane change), that the lane that is a lane change destination is recognized (actually present), that a yaw rate detected by the vehicle sensor is smaller than a threshold, and that a radius of a curvature of a road on which the host vehicle M is traveling is equal to or larger than a predetermined value. The conditions for executing the lane change may include other conditions, or some of the conditions may be omitted.

The recommender 160 presents or proposes the lane change of the host vehicle M to the driver. This processing will be described in detail later.

The specifier 170 specifies the position of the host vehicle M in the map information on the basis of map information (the first map information 54 or the second map information 62) including information on lanes, and the position of the host vehicle M. The map information includes information on lanes. The information on the lane is, for example, information such as a position at which a lane disappears or the number of lanes decreases, or a position at which the lane connects to the branch lane. The specifier 170 specifies the position of the host vehicle in the map information on the basis of the map information and the position of the host vehicle M. The specifier 170 specifies, for example, a position at which the lane corresponding to the position of the host vehicle M connects to the branch lane. For example, the specifier 170 specifies that the branch lane connects to the traveling lane 5 km ahead.

The control manager 180 causes the recommender 160 to recommend a lane change on the basis of the position of the host vehicle M. The control manager 180 causes the lane change controller 150 to change the lane of the host vehicle M when the driver performs an instruction for or approval of the recommendation. The control manager 180 instructs the lane change controller 150 to perform the lane change and causes the lane change controller 150 to execute the lane change of the host vehicle M. Details of processing of the control manager 180 will be described below.

The travel driving force output device 200 outputs a travel driving force (torque) for traveling of the vehicle to driving wheels. The travel driving force output device 200 includes, for example, a combination of an internal combustion engine, an electric motor, a transmission, and the like, and an ECU that controls these. The ECU controls the above configuration according to information input from the driving assistance device 100 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the driving assistance device 100 or the information input from the driving operator 80 so that a brake torque according to a braking operation is output to each wheel.

The steering device 220 includes, for example, a steering ECU and an electric motor. The electric motor, for example, changes orientations of steerable wheels by causing a force to act on a rack and pinion mechanism. The steering ECU drives the electric motor according to the information input from the driving assistance device 100 or the information input from the driving operator 80 to change the orientations of the steerable wheels.

[Recommendation for Lane Change (Road Recommendation)]

Figure 2:
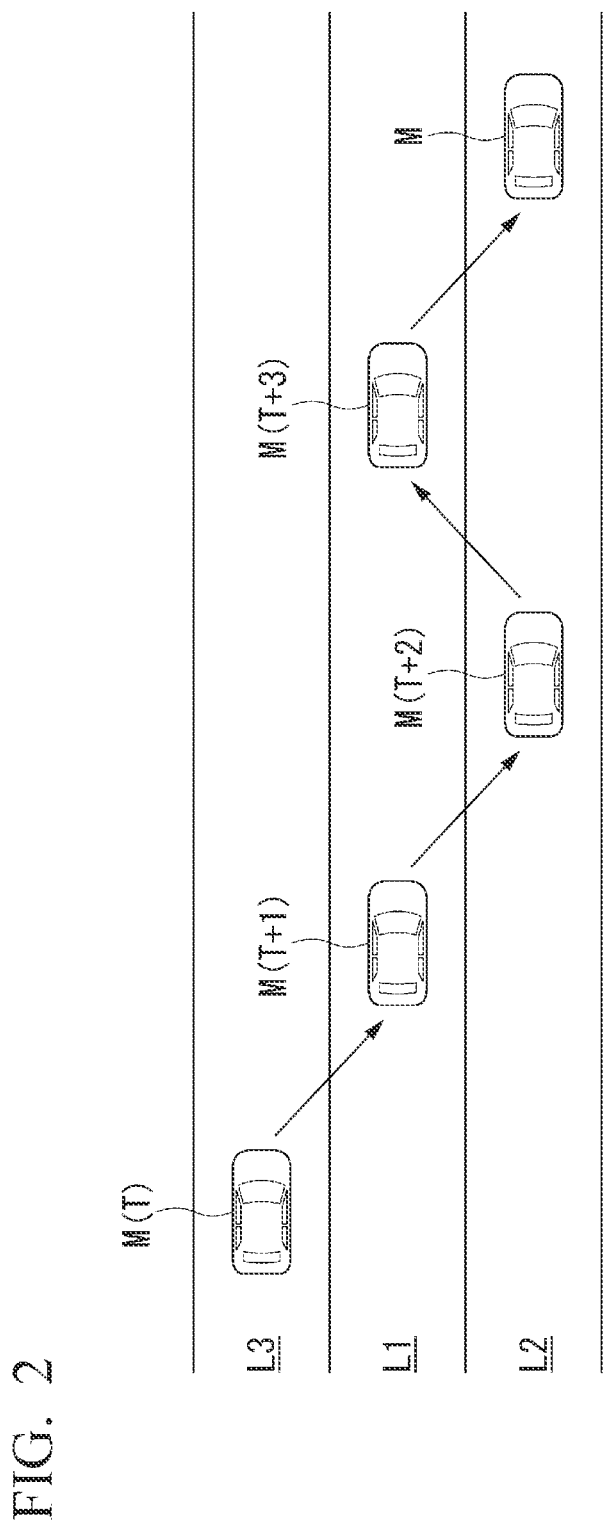
FIG. 2 is a diagram showing an example of a scene in which a recommender recommends a lane change.

The recommender 160 recommends (presents) a lane change to the driver. FIG. 2 is a diagram showing an example of a scene in which the recommender 160 recommends a lane change. In FIG. 2, a first lane L1 and a third lane L3 are traveling lanes, and a second lane L2 is an overtaking lane. The first lane L1 is a lane provided between the second lane L2 and the third lane L3.

When the host vehicle M is traveling in the third lane L3 on the basis of the ACC and the hands-off lane keeping control (at time T), the recommender 160 recommends the host vehicle M perform a lane change to the first lane L1, for example. The recommendation is made by a vocal sound, an image, or the like via the HMI 40, for example. When the driver operates a predetermined button (not shown) and grips the steering wheel in response to the recommendation, the lane change controller 150 causes the host vehicle M to perform the lane change. An instruction for the recommendation may be one or both of the operation with respect to a predetermined button (an operation with respect to an instruction button) and the gripping of the steering wheel.

When the host vehicle M is traveling in the first lane L1 (at time T+1), the recommender 160, for example, recommends the host vehicle M to perform a lane change to the third lane L3, which is the overtaking lane. When the host vehicle M performs the lane change and travels in the second lane L2 (at time T+2), the recommender 160, for example, recommends the host vehicle M to perform a lane change to the first lane L1, which is the traveling lane, and when the host vehicle M performs the lane change to the first lane L1 (at time T+3), the recommender 160 recommends the host vehicle M to perform a lane change to the third lane L3, which is the overtaking lane.

Thus, the recommender 160 recommends the host vehicle M to perform the lane change to the overtaking lane when the host vehicle M is located in the traveling lane, and the host vehicle M to perform the lane change to the adjacent traveling lane when the host vehicle M is located in the overtaking lane. Hereinafter, this processing may be referred to as "road recommendation". The lane change according to the road recommendation is an example of "a first operation of presenting, to the driver, a lane change to an adjacent lane adjacent to the lane in which the host vehicle is traveling without considering guiding the host vehicle to a set destination and causing the host vehicle to perform the lane change on the basis of an instruction of the driver."

When the host vehicle M is scheduled to travel on a branch road connecting to the third lane L3, the recommender 160 stops the road recommendation and recommends the host vehicle M to perform a lane change to the third lane L3. The recommender 160 stops the road recommendation when the position of the host vehicle M satisfies a condition as will be described below.

The road recommendation may be made in the following manner. The recommender 160 may recommend a lane change for overtaking a preceding vehicle when there is the preceding vehicle in front of the host vehicle M and the host vehicle M is likely to catch up with the preceding vehicle after a predetermined time. The recommender 160 may recommend a lane change for giving way to a vehicle behind the host vehicle M when there is a vehicle behind the host vehicle M and the vehicle behind the host vehicle M is likely to catch up with the host vehicle M after a predetermined time. In a case in which it is assumed that the host vehicle M travels in the first traveling lane L1 and the host vehicle M will interfere with traveling of another vehicle traveling in the second lane L2 when the host vehicle M performs the lane change to the second lane L2, the recommender 160 may recommend causing the host vehicle M to perform a lane change to the third lane L3. That is, the recommender 160 may present lane change to a lane in which the lane change is possible.

[Control when Host Vehicle is Scheduled to Travel in Branch Lane]

Figure 3:
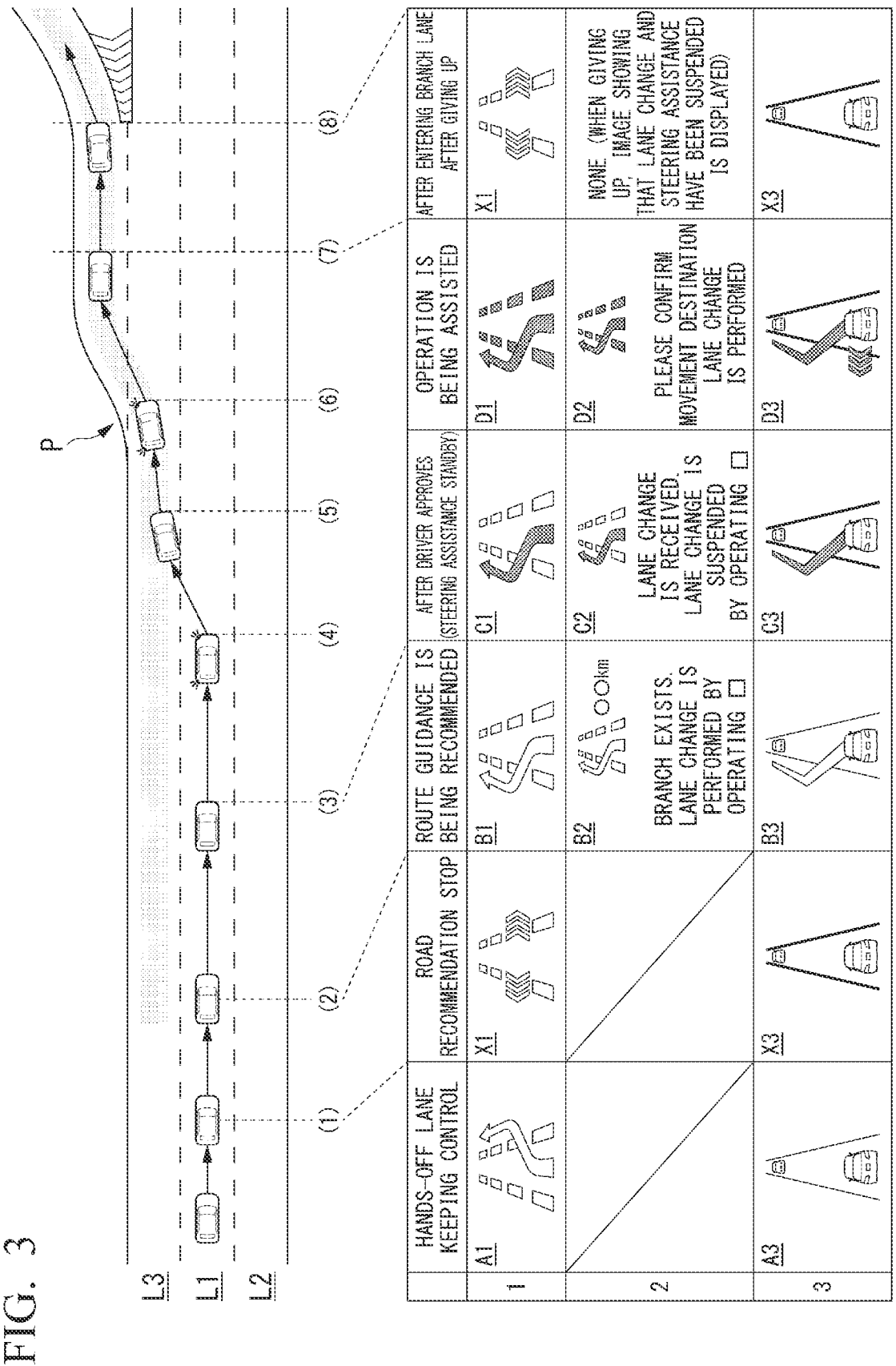
FIG. 3 is a diagram showing an example of a scene in which a host vehicle M travels in a branch lane.

When the destination of the host vehicle M is set and the host vehicle M travels in the branch lane toward the destination, the following control is executed. FIG. 3 is a diagram showing an example of a scene in which the host vehicle M travels in the branch lane. In the example of FIG. 3, a third lane L3 connects to the branch lane. The host vehicle M is present at a predetermined distance in the traveling direction from a connection position P in which the third lane L3 connects to the branch lane. The host vehicle M passes through a position (1), a position (2), a position (3), a position (4), and a position (5), reaches the connection position P, passes through a position (6), enters the branch lane, and passes through a position (7) and a position (8). Description of speed control of the host vehicle M will be omitted hereinafter, but the speed is appropriately adjusted (ACC is executed) in consideration of the surroundings situation and is controlled so that the lane changes can be performed smoothly when the host vehicle M performs the lane change.

The hands-off lane keeping control is executed and the road recommendation is made until the host vehicle M reaches the position (1). In this case, the control manager 180 causes an image A1 to be displayed in a first area of the display, causes an image not to be displayed in a second area, and causes an image A3 to be displayed in a third area. The image A1 is an example of a "first image".

The first area, the second area, and the third area may be different displays (display devices) or may be different areas in one display. For example, the first area, the second area, and the third area may be different areas in a multi-information display provided in front of a seat of the driver. The image displayed in the first area is, for example, an image corresponding to an indicator that notifies the driver of a state of the host vehicle M.

The image A1 is, for example, an image that recommends a lane change to the second lane L2, which is an overtaking lane. The image A3 is, for example, an image including a situation around the host vehicle M. The situation around the host vehicle M is, for example, an image showing information on other vehicles, road demarcation lines, or the like detected by the vehicle system 1. When the host vehicle M reaches the position (1), the road recommendation stops. An operation in this case is an example of "a third operation of stopping presenting or proposing the lane change in a set period between the first operation and the second operation when a plan is to perform the second operation after the first operation is performed."

The control manager 180 stops the road recommendation in a section from when the host vehicle M reaches the position (1) to when the host vehicle M reaches the position (2). When the road recommendation is stopped, the recommendation of the lane change in the recommender 160 is not made. Lane change based on an operation according to an intention of the user can be executed. For example, a lane change that is performed by the driver operating a lever of an operator of the direction indicator, or a lane change that is performed by the driver driving is executed.

The control manager 180 causes an image X1 to be displayed in the first area of the display, causes an image not to be displayed in the second area, and causes an image X3 to be displayed in the third area. The image X1 is an image showing that the road recommendation (lane change recommendation by the vehicle system 1) has not been made and the lane change according to the operation of the driver is possible. When the image X1 is displayed, a lane change by the lane change controller 150 is possible when the driver operates the direction indicator as described above. The image X3 is, for example, an image showing the situation around the host vehicle M.

The image X1 is an example of the "third image", "an image showing that the controller can causes the host vehicle to perform a lane change without relying on driving of the driver on the basis of an operation according to an intention of the driver, which is not an image showing that the controller presents or proposes the lane change", or "an image showing that causing the host vehicle to perform the lane change by the driver operating an operator for operating the direction indicator is possible".

When the host vehicle M reaches the position (2), route guidance recommendation is made. The route guidance recommendation is a recommendation (proposal) for causing the host vehicle M to perform the lane change when the lane change is necessary. The lane change according to the route guidance recommendation is an example of "a second operation of proposing a lane change required for guidance of the host vehicle to the destination to the driver and causing the host vehicle to perform a lane change on the basis of approval of the proposal by the driver".

The control manager 180 causes an image B1 to be displayed in the first area of the display, causes an image B2 to be displayed in the second area of the display, and causes an image B3 to be displayed in the third area of the display. The route guidance recommendation is made for a first time (for example, a maximum of 10 seconds). The image B1 is an image in which an arrow for recommending a lane change to the right in the image A1 is replaced with an arrow for recommending a lane change to the left. The image B2 includes information indicating that there is a branch at a predetermined distance ahead, information indicating that the lane change can be performed by operating an approval button (which may be the same as the predetermined button described above), and the image B1. The image B3 includes an image showing a future trajectory of the host vehicle M when the lane change is performed, in addition to the information of the image A3. The image B1 is an example of a "second image".

It is assumed that the driver has approved the lane change in a section from when the host vehicle M reaches the position (2) to when the host vehicle M reaches the position (3). In this case, the control manager 180 causes an image C1 to be displayed in the first area of the display, an image C2 to be displayed in the second area, and an image C3 to be displayed in the third area. The images C1, C2, and C3 are displayed for a second time (for example, a maximum of 30 seconds). The second time is longer than the first time.

The image C1 is an image in which an arrow indicating a direction of the lane change of the host vehicle M included in the image B1 is emphasized as compared to than the arrow of the image B1. The image C2 includes information indicating that the lane change has been received, information indicating that the lane change can be suspended when the approval button is operated, and the image C1. The image C3 is the same information as the image B3, but colors of arrows, road demarcation lines, and the like of the image B3 are different. In the image C3, acceptance of the lane change is represented by colors different from colors used in the image B3.

When the recommendation is not approved at the position (3) or at a predetermined distance before the position (3), the following steering assistance is not started, and the driver needs to perform a lane change of the host vehicle M. For example, the driver drives the host vehicle M to perform lane change, or operates the direction indicator to cause the lane change controller 150 to perform a lane change of the host vehicle M.

When the host vehicle M reaches the position (4), the steering assistance is started. The start of the steering assistance means starting an operation in which the host vehicle M performs the lane change. The start of the operation may be that the control manager 180 turns on the direction indicator or may be that the host vehicle M has started a lateral movement. The start of the operation may be another preset operation. A condition of the steering assistance is hands-on.

During the steering assistance, an image showing that operation assistance is in progress is displayed. The control manager 180 causes an image D1 to be displayed in the first area of the display, an image D2 to be displayed in the second area, and an image D3 to be displayed in the third area.

The image D1 is an image in which the image C1 is included and road demarcation lines included in the image C1 are emphasized as compared to the road demarcation lines in the image C1. The image D2 includes information for requesting the driver to confirm a movement destination, information indicating that lane change is being performed, and the image D1. The image D3 includes information (an arrow assigned to the left side of the vehicle) indicating that the host vehicle M is changing lanes, in addition to the information included in image C3.

The host vehicle M completes the lane change to the third lane L3 at the position (5), and at the position (6), the control manager 180 turns on the direction indicator without relying on an operation of the driver and causes the host vehicle M to perform the lane change from the third lane L3 to the branch lane. In the steering assistance, the image in the steering assistance described above is displayed. When the route guidance recommendation is approved in a case in which a plurality of lane changes are required, the control manager 180 causes the host vehicle M to perform a lane change a plurality of times to guide the host vehicle M to the destination according to one approval.

At the position (7), the lane change of the host vehicle M to the third lane L3 is completed. When the host vehicle M reaches the position (7), the control manager 180 causes an image X1 to be displayed in the first area of the display, causes an image not to be displayed in the second area, and causes an image X3 to be displayed in the third area. The image X1 is an example of "an image showing that the controller can cause the host vehicle to perform the lane change without relying on driving of the driver on the basis of an operation according to an intention of the driver, which is not an image showing that the controller presents or proposes the lane change".

When the host vehicle M reaches the position (8), which is an end position of the branch, the control manager 180 ends the driving assistance. Accordingly, the speed control and the steering control in the driving assistance device 100 end. After the end, the driver operates the driving operator 80 to drive the host vehicle M.

When the host vehicle M gives up before the lane change is completed in the route guidance recommendation, the image X1 is displayed in the first area, and an image showing that the lane change and the steering assistance are suspended is displayed in the second area, and the image X3 is displayed in the third area. "Gives up" means that the steering assistance cannot be continued, the operation assistance is suspended, and the lane change cannot be completed. The host vehicle M gives up the lane change according to the route guidance recommendation when the host vehicle M cannot complete the lane change until a desired position in each lane change. When the host vehicle M gives up, the driver operates the operator for operating the direction indicator to cause the host vehicle M to perform the lane change, or the driver drives and causes the host vehicle M to perform the lane change.

For example, when the host vehicle M cannot start the lateral movement before the host vehicle M reaches the desired position, the steering assistance is given up and suspended. "The host vehicle M cannot perform the lateral movement" means, for example, that the driver does not grip the steering wheel, that the host vehicle M cannot start lane change according to a situation of surrounding vehicles (for example, that the host vehicle M would interfere with other vehicles if a lane change were performed), that driving assistance device 100 has determined that recognition of the position of the host vehicle M is indefinite, that the lanes cannot be recognized, that traffic congestion is occurring ahead, and that conditions on which another lane change cannot be started are satisfied. Further, operation assistance is also stopped when conditions for interrupting the vehicle change after the lateral movement has been started are satisfied. The interrupting conditions are, for example, conditions that are the same as or similar to conditions in which the host vehicle M cannot start the lateral movement.

As described above, the driving assistance device 100 performs the road recommendation, stopping of the road recommendation, and the route guidance recommendation, thereby improving the convenience for the user, as described in comparison with comparative examples 1 and 2 that will be described below.

[Flowchart]

Figure 4:
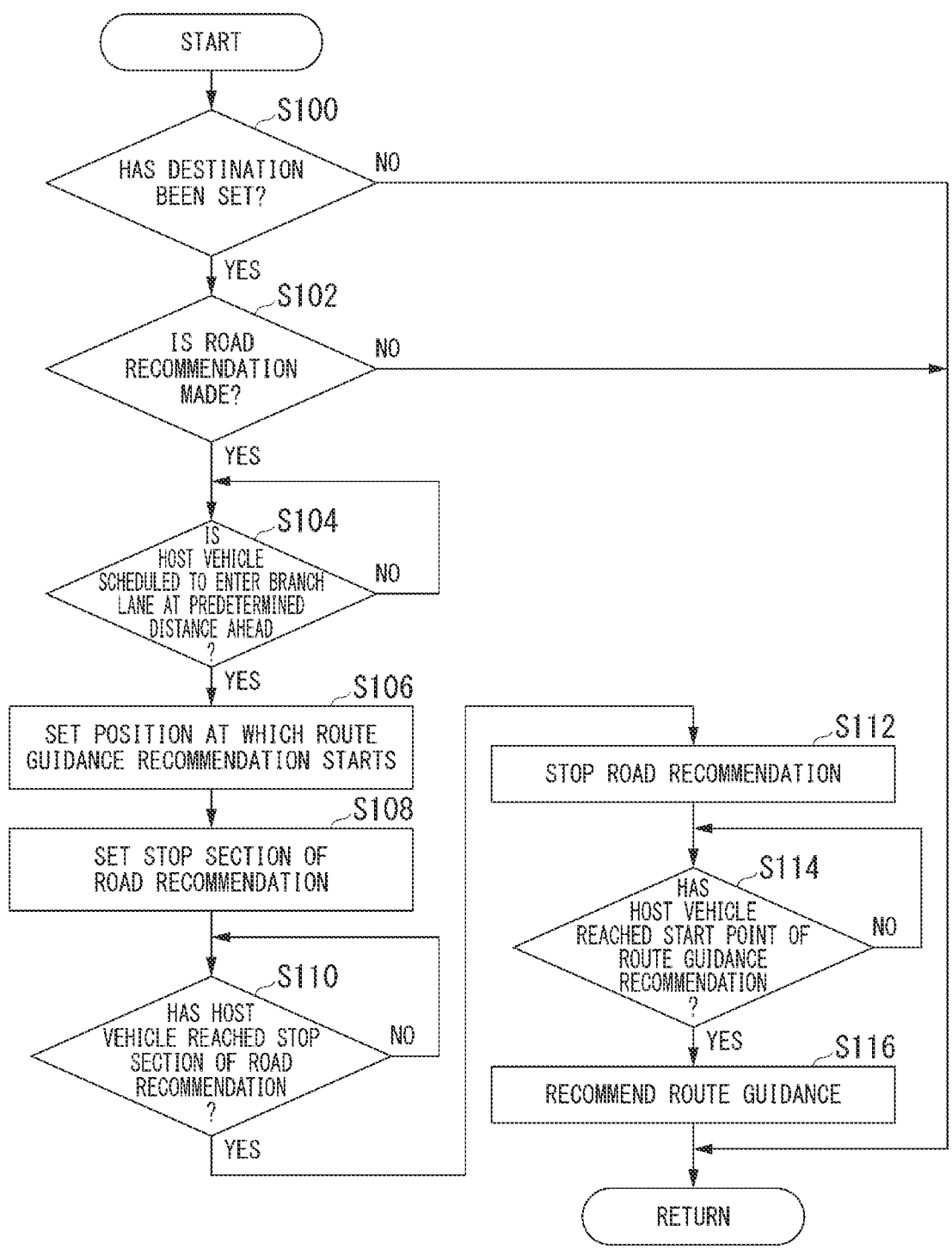
FIG. 4 is a flowchart showing an example of a flow of processing that is executed by a driving assistance device.

FIG. 4 is a flowchart showing an example of a flow of processing that is executed by the driving assistance device 100. First, the control manager 180 of the driving assistance device 100 determines whether or not the destination of the host vehicle M is set (step S100). When the destination is not set, processing of one routine of this flowchart ends. When the destination is set, the control manager 180 determines whether or not the road recommendation is being made (step S102). When the road recommendation is not being made, the processing of the one routine of this flowchart ends.

When the road recommendation is being made, the control manager 180 determines whether or not the host vehicle M is scheduled to enter a branch lane at a predetermined distance ahead (step S104). When the host vehicle M is scheduled to enter the branch lane, the control manager 180 sets a position at which the route guidance recommendation starts (step S106). The position at which the route guidance recommendation starts is, for example, a position at which the host vehicle M can perform a lane change and enter the branch lane with a margin. For example, when the host vehicle M needs to perform the lane change a plurality of times to enter a branch lane, the position at which the route guidance recommendation starts is set so that the route guidance recommendation starts earlier than when the host vehicle M performs the lane change once and enters the branch lane.

The control manager 180 sets a stop section of the road recommendation on the basis of the position determined in step S106 (step S108). The control manager 180 determines, for example, a position at a predetermined distance before the position at which the route guidance recommendation starts to be a position at which the road recommendation starts.

Next, the control manager 180 determines whether or not the host vehicle M has reached the stop section of the road recommendation (step S110). When the host vehicle M reaches the stop section of the road recommendation, the control manager 180 stops the road recommendation (step S112). Next, the control manager 180 determines whether or not the stop section of the road recommendation has ended and the host vehicle M has reached the start point of the route guidance recommendation (step S114). When the host vehicle M has reached the start point of the route guidance recommendation, the control manager 180 starts the route guidance recommendation (step S116). Processing regarding the route guidance recommendation is the processing described with reference to FIG. 3. Accordingly, processing of one routine in the present flowchart ends.

As described above, the driving assistance device 100 can improve convenience for the driver by setting a section in which the road recommendation is stopped.

Comparative Example 1

Figure 5:
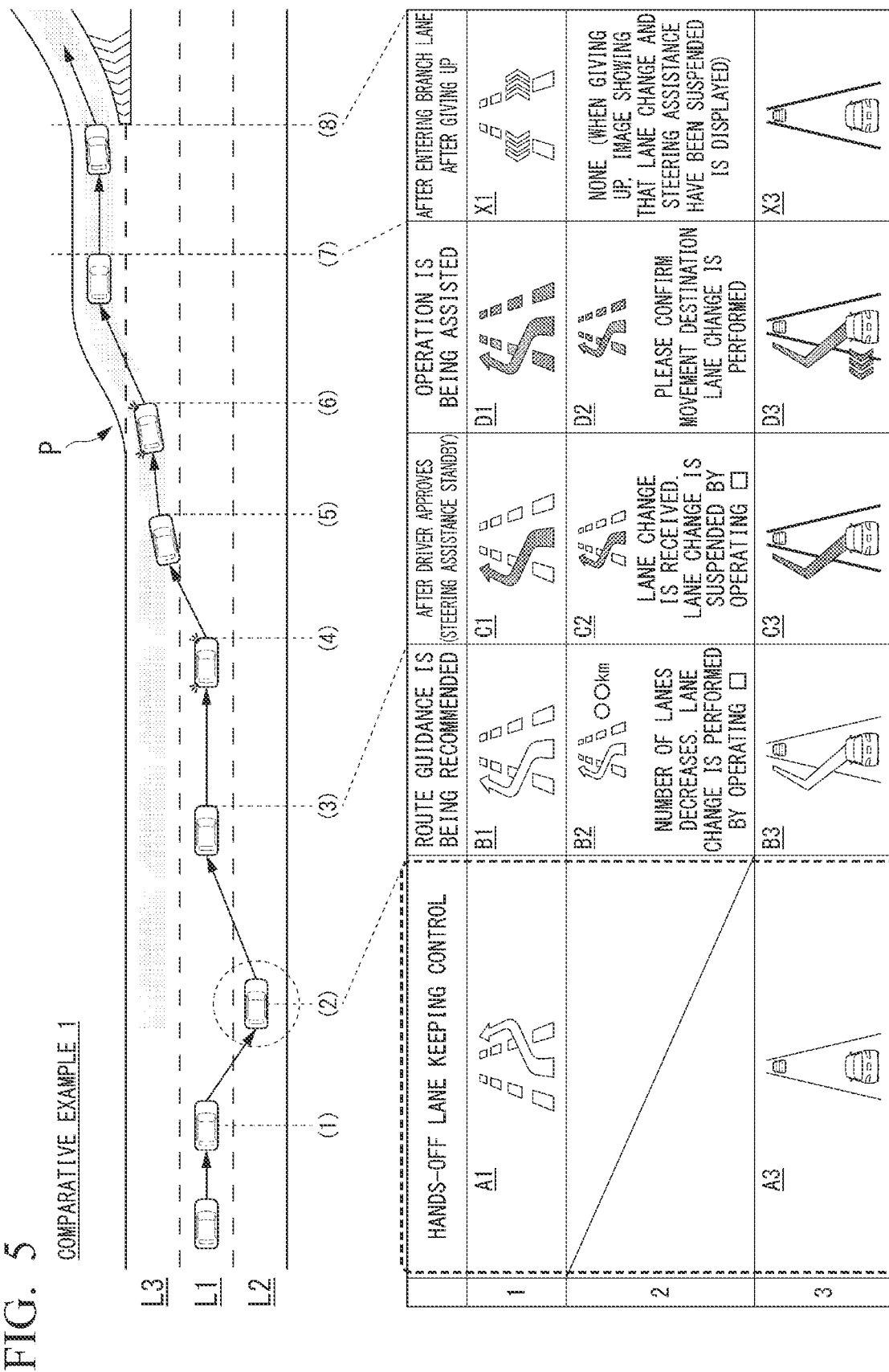
FIG. 5 is a diagram for describing comparative example 1.

FIG. 5 is a diagram for explaining comparative example 1. In comparative example 1, the road recommendation continues without providing a road recommendation stop section, and switching from the road recommendation to the route guidance recommendation is performed. For example, in the road recommendation, when the host vehicle is traveling in a first lane L1, a lane change to an overtaking lane is recommended, and when the host vehicle is traveling in a second lane L2, which is an overtaking lane, a lane change to the first lane L1 is recommended.

When the host vehicle instructs the road recommendation at a position (1) and performs the lane change to the second lane L2, the route guidance is recommended when the host vehicle reaches a position (2), the host vehicle performs the lane change to the first lane L1, also performs the lane change from the first lane L1 to the third lane L3, and enters a branch lane.

As described above, when the road recommendation stop section is not provided, the host vehicle performing lane change to a lane farther from the branch lane may be recommended. When the host vehicle performs the lane change in response to the recommendation, an amount of lateral movement of the host vehicle increases when the host vehicle performs a lane change to the branch lane, the burden on an occupant may increase or smooth lane change may be difficult.

On the other hand, in the present embodiment, the driving assistance device 100 can suppress the burden on an occupant or realize smooth lane change by providing the road recommendation stop section as described above.

Comparative Example 2

FIG. 6 is a diagram for explaining comparative example 2. In comparative example 2, the road recommendation is continued without providing the road recommendation stop section, and switching from the road recommendation to the route guidance recommendation is performed. It is assumed that the continued road recommendation (road recommendation executed instead of the road recommendation stop section) is a lane change to the third lane L3 near the branch lane.

For example, an image Y1 is displayed in the first area, and an image Y3 (the same image as the image A3) is displayed in the third area. The image Y1 is an image recommending the lane change to the third lane L3.

For example, in the road recommendation, in principle, the lane change to an overtaking lane is recommended when the host vehicle is traveling in a first lane L1, and lane change to the first lane L1 is recommended when the host vehicle is traveling in a second overtaking lane L2, as in FIG. 5. Such recommendation is made until the host vehicle reaches a position (1).

Thereafter, for example, when the host vehicle reaches the position (1), a lane change to a third lane L3 is recommended until a position (2). In this case, the driver may feel uncomfortable. This because the lane change to the second lane L2, which is an overtaking lane, is recommended until the position (1), but the lane change to the third lane L3, which is a traveling lane, is suddenly recommended when the host vehicle reaches the position (1).

On the other hand, in the present embodiment, the driving assistance device 100 can suppress the driver feeling uncomfortable by providing the road recommendation stop section as described above.

(Others)

It is preferable for the road recommendation stop section shown in FIG. 3 described above is provided on the basis of a position at a predetermined distance from a connection point P between the branch lane and the third lane L3. The position at the predetermined distance may be, for example, a position at which the driver can recognize that there is a branch lane ahead or a position based on the position at which the driver can recognize that there is the branch lane ahead (for example, a position after the position at which the driver can recognize that there is the branch lane ahead, which is a position at which the lane change to the branch lane based on the route guidance recommendation can be performed with a margin). For example, the position at the predetermined distance is set on the basis of a position at which a marking, signboard, sign, or the like indicating that there is the branch lane a predetermined distance ahead is provided.

For example, when the map information includes the position at which the marking, signboard, sign, or the like is provided, the control manager 180 specifies the position at the predetermined distance on the basis of the position of the host vehicle M and the map information. The control manager 180 may specify the position at the predetermined distance on the basis of a recognition result of the recognizer 110. For example, the control manager 180 may determine the position at which the marking, signboard, sign, or the like recognized by the recognizer 110 is provided, or a predetermined distance before this position, to be the position at the predetermined distance.

According to the embodiment described above, the driving assistance device 100 can improve the convenience for the user by providing the road recommendation stop section. Although a case in which the road recommendation stop section is provided in the road recommendation has been described in the present embodiment, the route guidance recommendation stop section may be instead provided in the route guidance recommendation, and the recommendation by the vehicle system 1 may be stopped in this stop section.

The embodiment described above can be expressed as follows.

A control device including
a storage device that stores a program, and
a hardware processor,
wherein the hardware processor executes the program stored in the storage device to execute:
processing for recognizing a situation of surroundings of a host vehicle;
processing for automatically controlling at least steering of the host vehicle to cause the host vehicle to perform the lane change on the basis of the recognized situation of the surroundings;
first processing for presenting a lane change to an adjacent lane adjacent to a lane in which the host vehicle travels to a driver without considering of guiding the host vehicle to a set destination, and causing the host vehicle to perform the lane change on the basis of an instruction of the driver;
second processing for proposing a lane change required for guidance of the host vehicle to the destination to the driver and causing the host vehicle to perform a lane change on the basis of approval of the proposal by the driver; and
third processing for stopping presenting and proposing the lane change in a set period between the first processing and the second processing when a plan is to execute the second processing after the first processing.

As described above, the mode for carrying out the present invention has been described using the embodiments, but the present invention is not limited to such embodiments at all, and various modifications and replacements can be made without departing from the gist of the present invention.

What is claimed is:

1. A vehicle system comprising:
a storage medium configured to store computer-readable instructions; and
one or more processors connected to the storage medium, wherein the one or more processors execute the computer-readable instructions to:
recognize a situation of surroundings of a host vehicle,
automatically control at least steering of the host vehicle to cause the host vehicle to perform a lane change on the basis of the recognized situation of the surroundings of the host vehicle,
a first operation of presenting, to a driver, a lane change to a second lane adjacent to a first lane in which the host vehicle travels without considering of guiding the host vehicle to a destination, and causing the host vehicle to perform the lane change on the basis of an instruction of the driver when the host vehicle travels in the first lane,
based on a determination that the driver does not instruct the lane change to the second lane and the host vehicle reaches a first position that is a first distance before a reference position, stopping the presenting of the lane change to the second lane to the driver and presenting information to the driver that indicates the road recommendation is not being made, and
a second operation of proposing, to the driver, a lane change to a third lane adjacent to the first lane required for guidance of the host vehicle to the destination and causing the host vehicle to perform the lane change to the third lane on the basis of an approval of the proposal by the driver when the host vehicle travels in the first lane and the host vehicle reaches a second position that is a second distance before the reference position, the second position is closer to the reference position than the first position, the third lane is a lane that connects to a branch lane in which the host vehicle is scheduled to travel toward the destination.

2. The vehicle system according to claim 1, wherein the one or more processors execute the computer-readable instructions to cause the host vehicle to perform a lane change a plurality of times to guide the host vehicle to the destination according to one approval when the driver performs one approval of the proposal in a case in which a plurality of lane changes are required to guide the host vehicle to the destination in the second operation.

3. The vehicle system according to claim 1, wherein instruction or the approval is one or both of the driver operating a predetermined button and the driver gripping a steering wheel.

4. The vehicle system according to claim 1, wherein the second operation is an operation of proposing a lane change to a branch lane to the driver when the host vehicle is traveling in a lane different from a branch lane in which the host vehicle is scheduled to travel toward the destination, and causing the host vehicle to perform the lane change to the branch lane without relying on driving of the driver on the basis of the approval of the proposal by the driver.

5. The vehicle system according to claim 1, wherein in the first operation, presenting the lane change from the lane in which the host vehicle travels to an adjacent lane in which lane change is possible is repeated, and the host vehicle is caused to perform the lane change to the adjacent lane on the basis of an instruction of the driver.

6. The vehicle system according to claim 1,
wherein the one or more processors execute the computer-readable instructions to cause a first image recommending a lane change to be displayed on the display in the first operation,
cause a second image recommending a lane change to be displayed on the display after the second operation is started, and
cause a third image different from the first image and the second image to be displayed on the display during the stopping of the presenting of the lane change to the second lane and before the second operation is started.

7. The vehicle system according to claim 6, wherein the third image is not an image showing presenting or proposing the lane change, but is an image showing that causing the host vehicle to perform the lane change is possible without relying on driving of the driver on the basis of an operation according to an intention of the driver.

8. The vehicle system according to claim 7, wherein the third image is an image showing that causing the host vehicle to perform the lane change by a driving operator operating a direction indicator is possible.

9. The vehicle system according to claim 6,
wherein the second operation is an operation of proposing a lane change to a branch lane to the driver when the host vehicle is traveling in a lane different from a branch lane in which the host vehicle is scheduled to travel toward the destination, and causing the host vehicle to perform the lane change to the branch lane without relying on driving of the driver on the basis of the approval of the proposal by the driver, and
the one or more processors execute the computer-readable instructions to cause an image, the image being not an image showing presenting or proposing the lane change but being an image showing that causing the host vehicle to automatically perform the lane change is possible without relying on driving of the driver on the basis of an operation according to an intention of the driver, to be displayed on a display, when the host vehicle has performed lane change to the branch lane.

10. The vehicle system according to claim 1, wherein the one or more processors execute the computer-readable instructions to cause the host vehicle to perform the lane change in response to a predetermined operation when the driver performs the predetermined operation with respect to an operator for operating a direction indicator in a case in which the stopping the presenting of the lane change to the second lane to the driver and the presenting information that indicates the road recommendation is not being made is being performed.

11. The vehicle system according to claim 1,
wherein when the host vehicle is traveling in a first lane on a road having the first lane, the second lane serving as an overtaking lane adjacent to the first lane, and the third lane adjacent to the first lane connecting to a branch lane,
the one or more processors execute the computer-readable instructions to
cause the host vehicle to perform a lane change to the second lane serving as an overtaking lane in the first operation, and
make a proposal to cause the host vehicle to perform a lane change to the third lane in the second operation after the stopping the presenting of the lane change to the second lane to the driver.

12. The vehicle system according to claim 1,
wherein the stopping the presenting of the lane change to the second lane to the driver is a third operation,
wherein the one or more processors execute the computer-readable instructions to
cause a first image recommending a lane change to be displayed on the display in the first operation,
cause a second image recommending a lane change to be displayed on the display after the third operation ends and the second operation is started, and
cause a third image different from the first image and the second image to be displayed on the display in the third operation,
wherein the third image is not an image showing presenting or proposing the lane change, but is an image showing that causing the host vehicle to perform the lane change is possible without relying on driving of the driver on the basis of an operation according to an intention of the driver.

13. A control method comprising:
processing for recognizing, by a control device, a situation of surroundings of a host vehicle;
processing for automatically controlling, by the control device, at least steering of the host vehicle to cause the host vehicle to perform the lane change on the basis of the recognized situation of the surroundings of the host vehicle;
first processing for presenting, by the control device, a lane change to a second lane adjacent to a first lane in which the host vehicle travels to a driver without considering of guiding the host vehicle to a destination, and causing the host vehicle to perform the lane change on the basis of an instruction of the driver when the host vehicle travels in the first lane;

based on a determination that the driver does not instruct the lane change to the second lane and the host vehicle reaches a first position that is a first distance before a reference position, stop presenting the lane change to the second lane to the driver and present information to the driver that indicates the road recommendation is not being made; and second processing for proposing, by the control device, lane change to a third lane adjacent to the first lane required for guidance of the host vehicle to the destination to the driver and causing the host vehicle to perform a lane change to the third lane on the basis of an approval of the proposal by the driver when the host vehicle travels in the first lane and the host vehicle reaches a second position that is a second distance before the reference position, the second position is closer to the reference position than the first position, the third lane is a lane that connects to a branch lane in which the host vehicle is scheduled to travel toward the destination.

14. A non-transitory computer storage medium having a program stored therein, the program causing a control device to execute:

processing for recognizing a situation of surroundings of a host vehicle;

processing for automatically controlling at least steering of the host vehicle to cause the host vehicle to perform the lane change on the basis of the recognized situation of the surroundings of the host vehicle;

first processing for presenting lane change to a second lane adjacent to a first lane in which the host vehicle travels to a driver without considering of guiding the host vehicle to a destination, and causing the host vehicle to perform the lane change on the basis of an instruction of the driver when the host vehicle travels in the first lane;

based on a determination that the driver does not instruct the lane change to the second lane and the host vehicle reaches a first position that is a first distance before a reference position, stop presenting the lane change to the second lane to the driver and present information to the driver that indicates the road recommendation is not being made; and second processing for proposing a lane change to a third lane adjacent to the first lane required for guidance of the host vehicle to the destination to the driver and causing the host vehicle to perform a lane change to the third lane on the basis of an approval of the proposal by the driver when the host vehicle travels in the first lane and the host vehicle reaches a second position that is a second distance before the reference position, the second position is closer to the reference position than the first position, the third lane is a lane that connects to a branch lane in which the host vehicle is scheduled to travel toward the destination.

* * * * *